(12) United States Patent
Ishii

(10) Patent No.: US 6,968,018 B2
(45) Date of Patent: Nov. 22, 2005

(54) DIGITAL BROADCAST RECEIVING APPARATUS, AND A METHOD FOR RECEIVING DIGITAL BROADCASTS

(75) Inventor: Toshisada Ishii, Tokyo (JP)

(73) Assignee: Sony Corporation, (JP)

( * ) Notice: Subject to any disclaimer, the term of this patent is extended or adjusted under 35 U.S.C. 154(b) by 713 days.

(21) Appl. No.: 09/917,976

(22) Filed: Jul. 30, 2001

(65) Prior Publication Data

US 2002/0071498 A1 Jun. 13, 2002

(30) Foreign Application Priority Data

Jul. 28, 2000 (JP) ............................ P2000-229639

(51) Int. Cl.[7] ........................ H03K 9/00; H04L 27/06; H04L 27/14; H04L 27/22
(52) U.S. Cl. ...................... 375/316; 455/3.02; 725/31; 725/68; 725/104; 725/132; 380/241
(58) Field of Search ................................ 375/316, 219, 375/259; 455/3.02; 380/200, 252, 241; 725/31, 725/68, 104–105, 132, 135, 151–152

(56) References Cited

U.S. PATENT DOCUMENTS 5,036,537 A * 7/1991 Jeffers et al. ............... 380/241

6,035,037 A * 3/2000 Chaney ...................... 380/227

FOREIGN PATENT DOCUMENTS

EP 0 562 295 A1 9/1993

* cited by examiner

Primary Examiner—Jean B. Corrielus
(74) Attorney, Agent, or Firm—Lerner, David, Littenberg, Krumholz & Mentlik, LLP

(57) ABSTRACT

A receiving apparatus receives digital broadcast signals from a plurality of broadcasting companies in different receiving modes from each other at low cost. It is determined to what limited receiving mode an IC card, mounted to an IC card interface section, corresponds. When the IC card is an effective IC card which corresponds to the limited receiving mode of an output stream selected by the user, a CPU performs control in such a manner that the limited receiving processing is conducted for the output stream by use of the contract information and the scramble key information controlled by the IC card. Specifically, when reception of the program designated by the user through a selecting operation is limited, the CPU allows a descrambling section to unscramble the output stream, so that the user can watch and listen to the program. By simply exchanging the IC cards mounted on the interface section, it becomes possible to receive the digital broadcast signals from the broadcasting companies.

8 Claims, 5 Drawing Sheets

DIGITAL BROADCAST RECEIVING APPARATUS, AND A METHOD FOR RECEIVING DIGITAL BROADCASTS

CROSS-REFERENCE TO RELATED APPLICATIONS

The present application claims priority from Japanese Application No. P2000-229639 filed Jul. 28, 2000, the disclosure of which is hereby incorporated by reference herein.

BACKGROUND OF INVENTION

The present invention relates to a digital broadcast receiving apparatus, and a method for receiving digital broadcasts. Specifically, the present invention relates to a digital broadcast receiving apparatus and the like structured in such a manner that it identifies to what limited receiving mode an integrated circuit (IC) card, mounted to an integrated circuit (IC) card interface section thereof, for controlling contract information and scramble key information necessary for limited receiving processing corresponds. When the IC card corresponds to the limited receiving mode of the digital data output from a receiver, the apparatus performs limited receiving processing for the above-described digital data using the contract information and the scramble key information controlled by this IC card. This structure makes it possible to provide a receiving apparatus for receiving digital broadcast signals from a plurality of broadcasting companies in different limited receiving modes from each other at low cost.

In many cases, limited receiving systems used in digital broadcasting are in different limited receiving modes if broadcasting companies which use the systems differ from each other. Conventionally, each digital broadcast receiving apparatus corresponds to only a specific kind of limited receiving mode.

In the case of using conventional digital broadcast receiving apparatuses such as described above, it is impossible to utilize a service in a limited receiving mode which does not correspond to each of the apparatuses, even though they are in common signal processing modes for processing images, sounds, or data which constitute the service.

SUMMARY OF THE INVENTION

The present invention provides a digital broadcast receiving apparatus and the like capable of structuring a receiving apparatus for receiving digital broadcast signals from a plurality of broadcasting companies in different limited receiving modes from each other at low cost.

A digital broadcast receiving apparatus according to the present invention includes a receiver operable to selectively receive a plurality of digital broadcast signals, and to output digital data corresponding to the received digital broadcast signals, at least some of the output digital data corresponding to a plurality of different limited receiving modes; a processor operable to selectively perform limited receiving processing for the at least some of the output digital data; an IC card corresponding to one of the limited receiving modes and being operable to control contract information and scramble key information necessary to perform the limited receiving processing, the IC card being mounted to an IC card interface section operable to communicate with the IC card; an identifier operable to identify to which of the limited receiving modes the IC card mounted to the IC card interface section corresponds; and a controller operable to control the processor to perform the limited receiving processing for the output digital data by use of the contract information and the scramble key information when the controller judges, based on the result of identification by the identifier, that the IC card mounted to the IC card interface section corresponds to the limited receiving mode of the output digital data.

A method for receiving digital broadcasts according to the present invention includes selectively receiving a plurality of digital broadcast signals, and outputting digital data corresponding to the received digital broadcast signals, at least some of the output digital data corresponding to a plurality of different limited receiving modes; mounting an IC card to an IC card interface section, the IC card corresponding to one of the limited receiving modes and being operable to control contact information and scramble key information necessary to perform limited receiving processing for the at least some output digital data; identifying to which of the limited receiving modes the IC card corresponds; and performing the limited receiving processing for the output digital data by use of the contract information and the scramble key information when the IC card mounted to the IC card interface section corresponds to the limited receiving mode of the output digital data.

In the present invention, a plurality of digital broadcast signals are selectively received by the receiver. The receiver outputs digital data corresponding to the received digital broadcast signals. At least some of the output digital data corresponds to a plurality of different limited receiving modes. In addition, an IC card interface section is provided, and an IC card is mounted to the IC card interface section. The IC card is used to control contract information and scramble key information required for limited receiving processing.

An identifier identifies to which of the limited receiving modes the IC card mounted to the IC card interface section corresponds. When the IC card corresponds to the limited receiving mode of the digital data output from the receiver, a processor performs limited receiving processing for the digital data by use of the contract information and the scramble key information which are controlled by the IC card.

For example, it is judged whether digital data receiving is possible or impossible from the limited receiving information extracted from the digital data and the contract information controlled by the IC card. When digital data receiving is possible, the digital data is unscrambled by use of the scramble key information controlled by the IC card.

As described above, it is determined to which of the limited receiving modes the IC card mounted to the IC card interface section corresponds. If the IC card corresponds to the limited receiving mode of the digital data output from the receiver, limited receiving processing is performed for the digital data by use of the contract information and the scramble key information controlled by the IC card. This structure makes it possible to provide a receiving apparatus for receiving digital broadcast signals from a plurality of broadcasting companies in different limited receiving modes from each other at low cost.

A digital broadcast receiving apparatus according to another embodiment of the present invention includes a receiver operable to selectively receive a plurality of digital broadcast signals, and to output digital data corresponding to the received digital broadcast signals, at least some of the output digital data corresponding to a plurality of different limited receiving modes; a processor operable to selectively perform limited receiving processing for the at least some of the output digital data; a plurality of IC cards each corresponding to a different one of the limited receiving modes and being operable to control contract information and scramble key information necessary to perform the limited receiving processing; a plurality of IC card interface sections, each of the IC cards being adapted for mounting to one of the IC card interface sections so that the one IC card interface section can communicate with the IC card mounted thereto; an identifier operable to identify to which of the limited receiving modes a predetermined one of the IC cards mounted to one of the plurality of IC card interface sections corresponds; and a controller operable to control the processor to perform the limited receiving processing for the output digital data by use of the contract information and the scramble key information controlled by the predetermined IC card when the controller judges, based on the result of identification by the identifier, that the predetermined IC card corresponds to the limited receiving mode of the output digital data.

A method for receiving digital broadcasts according to a further aspect of the present invention includes selectively receiving a plurality of digital broadcast signals, and outputting digital data corresponding to the received digital broadcast signals, at least some of the output digital data corresponding to a plurality of different limited receiving modes; providing a plurality of IC cards, each of the IC cards corresponding to a different one of the limited receiving modes and being operable to control contract information and scramble key information necessary to perform limited receiving processing for the at least some output digital data; mounting a predetermined one of the IC cards to one of a plurality of IC card interface sections; identifying to which of the limited receiving modes the predetermined IC card corresponds; and performing the limited receiving processing for the output digital data by use of the contract information and the scramble key information controlled by the predetermined IC card when the predetermined IC card corresponds to the limited receiving mode of the output digital data.

In the present invention, a plurality of digital broadcast signals are selectively received by the receiver. The receiver outputs digital data corresponding to the received digital broadcast signals. At least some of the output digital data corresponds to a plurality of different limited receiving modes. In addition, a plurality of IC card interface sections are provided, and one or a plurality of IC cards are mounted to the IC card interface sections. The IC cards are used to control contract information and scramble key information required for limited receiving processing.

An identifier identifies to which of the limited receiving modes one or a plurality of the IC cards mounted to a plurality of IC card interface sections correspond. When a predetermined IC card mounted to one of the plurality of IC card interface sections corresponds to the limited receiving mode of the digital data output from the receiver, a processor performs limited receiving processing for the digital data by use of the contract information and the scramble key information which are controlled by the predetermined IC card.

As described above, it is determined to which of the limited receiving modes one or a plurality of the IC cards mounted to a plurality of IC card interface sections correspond. If a predetermined IC card mounted to one of the plurality of IC card interface sections corresponds to the limited receiving mode of the digital data output from the receiver, limited receiving processing is performed for the digital data by use of the contract information and the scramble key information controlled by the predetermined IC card. This structure makes it possible to provide a receiving apparatus for receiving digital broadcast signals from a plurality of broadcasting companies in different limited receiving modes from each other at low cost. In addition, in this structure, it is possible to simultaneously mount IC cards corresponding to a plurality of limited receiving modes to a plurality of IC card interface sections. This structure prevents a disadvantage, before it happens, that a user cannot utilize a service which he or she wants to use because the user has not mounted a proper IC card.

When two or more IC cards corresponding to an identical limited receiving mode are mounted to a plurality of IC card interface sections, this may be announced to the user. In this case, the user selects one IC card which he or she should use from the plurality of IC cards, based on this announcement.

DETAILED DESCRIPTION

Figure 1:
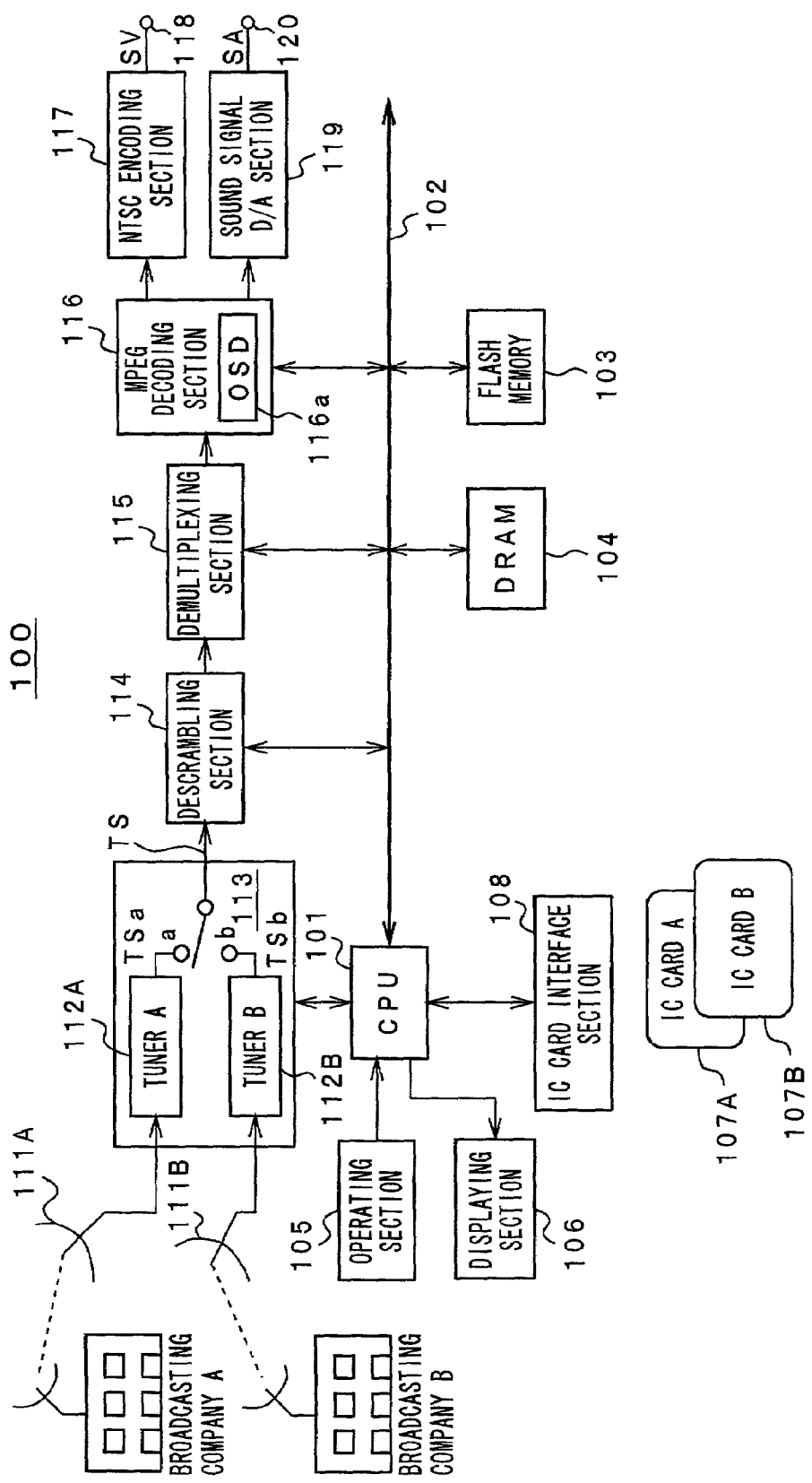
FIG. 1 is a block diagram showing a structure of a digital broadcast receiving apparatus according to an embodiment of the present invention.

Hereinafter, embodiments of the present invention will be described with reference to drawings. FIG. 1 is a diagram showing a structure of a digital broadcast receiving apparatus 100 according to an embodiment of the present invention.

The receiving apparatus 100 includes a central processing unit (CPU) 101 as a controller for controlling the entire operation of the apparatus. The CPU 101 is connected to a bus 102 in a control system and information system. Connected to the bus 102 are a flash memory 103 and a dynamic random access memory (DRAM) 104. The flash memory 103 stores data and programs required for the operation of the CPU 101. The DRAM 104 stores data generated in accordance with the control performed by the CPU 101, and addition data obtained from MPEG2 transport stream TS as will be described later. The DRAM 104 also serves as a working area.

The receiving apparatus 100 has an operating section 105 which includes a plurality of operating keys, a liquid crystal display element, and the like. The receiving apparatus 100 also includes a displaying section 106 for displaying the state of the receiving apparatus 100, and an IC card interface section 108 for communicating with IC cards 107A and 107B mounted thereto. The operating section 105, the displaying section 106, and the interface section 108 are respectively connected to the CPU 101.

The IC cards 107A and 107B respectively control contract information and scramble key information required for limited receiving processing. In addition, the IC cards 107A and 107B have the following function. That is, they judge whether listening to and watching a program are possible or impossible, based on the limited receiving information sent from the CPU 101 via the interface section 108. If listening to and watching the program are possible, the IC cards 107A and 107B send the scramble key information to the CPU 101 via the interface section 108.

The IC card (IC card A) 107A corresponds to the limited receiving mode of a broadcasting company A. The IC card (IC card B) 107B corresponds to the limited receiving mode of a broadcasting company B. These IC cards 107A and 107B are in conformity with, for example, an international standard ISO 7816 for an IC card with an external terminal. The international standard ISO 7816 is a standard which defines command/response in the limited receiving mode that each of the broadcasting companies exclusively uses, in addition to the communication protocol between the IC cards and the receiving apparatus.

The receiving apparatus 100 also includes an antenna 111A, a tuner (tuner A) 112A, an antenna 111B, and a tuner (tuner B) 112B. The antenna 111A receives digital broadcast signals from the broadcasting company A. The tuner 112A selects a broadcast signal of a predetermined RF channel from digital broadcast signals in a plurality of RF channels received by the antenna 111A, so as to obtain a motion picture experts group 2 (MPEG2) transport stream TSa which corresponds to the broadcast signal of the predetermined RF channel. The antenna 111B receives digital broadcast signals from the broadcasting company B. The tuner 112B selects a broadcast signal of a predetermined RF channel from digital broadcast signals in a plurality of RF channels received by the antenna 111B, so as to obtain a motion picture experts group 2 (MPEG2) transport stream TSb which corresponds to the broadcast signal of the predetermined RF channel.

The receiving apparatus 100 also includes a switch 113 for selectively taking out and outputting the transport stream TSa from the tuner 112A or the transport stream TSb from the tuner 112B. The transport stream TSa from the tuner 112A is supplied to a fixed terminal at the side a of the switch 113. On the other hand, the transport stream TSb from the tuner 112B is supplied to a fixed terminal at the side b of the switch 113.

The operations of the tuner 112A and the tuner 112B, and the switching of the switch 113, are controlled by the CPU 101. Specifically, when a user operates the operating section 105 to make a request for selecting a program relating to the digital broadcast A supplied by the broadcasting company A, the CPU 101 actuates the tuner 112A, and controls it to select the digital broadcast signal including the required program. Then, the CPU 101 switches the switch 113 to the side a in such a manner that the switch 113 takes out the transport stream TSa output from the tuner 112A.

On the other hand, when a user operates the operating section 105 to make a request for selecting a program relating to the digital broadcast B supplied by the broadcasting company B, the CPU 101 actuates the tuner 112B, and controls it to select the digital broadcast signal including the required program. Then, the CPU 101 switches the switch 113 to the side b in such a manner that the switch 113 takes out the transport stream TSb output from the tuner 112B.

The receiving apparatus 100 also includes a descrambling section 114 and a demultiplexing section 115. The descrambling section 114 performs a process of unscrambling packets of scrambled video data and audio data which constitute the transport stream TS (digital data) taken out by the switch 113. The demultiplexing section 115 separates a packet of video data and audio data of the program designated by the user through operation of the operating section 105, and also separates a packet of additional data of the designated program. The additional data is supplied to the CPU 101 via the bus 102.

In addition, the receiving apparatus 100 includes an MPEG decoding section 116, an NTSC encoding section 117, an output terminal 118, a sound signal D/A section 119, and an output terminal 120. A packet of video data and audio data which have been separated by the demultiplexing section 115 is input into the MPEG decoding section 116. The MPEG decoding section 116 performs data elongation for the input packet, and then outputs video data and audio data. The NTSC encoding section 117 processes the video data which has been output from the decoding section 116 so as to obtain a visual signal SV in NTSC mode. This visual signal SV is output from the output terminal 118. The sound signal D/A section 119 converts the audio data output from the MPEG decoding section 116 from a digital signal into an analog signal so as to obtain a sound signal SA. This sound signal SA is output from the output terminal 120.

The descrambling section 114, the demultiplexing section 115, and the MPEG decoding section 116 described above are respectively connected to the bus 102. The MPEG decoding section 116 includes an on screen display (OSD) processing section 116a which enables an OSD display.

Hereinafter, an operation of the digital broadcast receiving apparatus 100 shown in FIG. 1 will be described.

Digital broadcast signals in a plurality of RF channels, which have been received by the antenna 111A, are supplied to the tuner 112A. On the other hand, digital broadcast signals in a plurality of RF channels, which have been received by the antenna 111B, are supplied to the tuner 112B.

When a user operates the operating section 105 to make a request for selecting a program relating to the digital broadcast A supplied by the broadcasting company A, the CPU 101 actuates the tuner 112A, and controls it to select the digital broadcast signal including the required program. Then, the CPU 101 switches the switch 113 to the side a. The switch 113 takes out the transport stream TSa relating to the selected digital broadcast signal.

On the other hand, when a user operates the operating section 105 to make a request for selecting a program relating to the digital broadcast B supplied by the broadcasting company B, the CPU 101 actuates the tuner 112B, and controls it to select the digital broadcast signal including the required program. Then, the CPU 101 switches the switch 113 to the side b. The switch 113 takes out the transport stream TSb relating to the selected digital broadcast signal.

The transport stream TS, which has been taken out by the switch 113, is supplied to the demultiplexing section 115 via the descrambling section 114. The demultiplexing section 115 separates the packet of the video data and audio data of the program designated by the user operation, and also separates the packet of the additional data of the designated program.

When reception of the program designated by the user operation described above is to be limited, the CPU 101 confirms the result of identification as to what limited receiving mode the IC card mounted to the IC card interface section 108 corresponds. If the IC card mounted to the IC card interface section 108 is an effective IC card which corresponds to the limited receiving mode of the transport stream TS taken out by the switch 113, the CPU 101 transmits the limited receiving information, extracted from the additional data, to the IC card via the interface section 108.

For example, when the transport stream TSa from the tuner 112A is taken out by the switch 113 in the state where the IC card 107A is mounted to the IC card interface section 108, this means that an effective IC card is mounted. Similarly, when the transport stream TSb from the tuner 112B is taken out by the switch 113 in the state where the IC card 107B is mounted to the IC card interface section 108, this means that an effective IC card is mounted.

The IC card, to which the limited receiving information has been sent from the CPU 101 as described above, judges whether watching and listening to the program is possible or impossible, based on the limited receiving information. When watching and listening to the program is possible, this IC card sends scramble key information to the CPU 101 via the interface section 108. The CPU 101 sets the key information to the descrambling section 114. As a result of this operation, the descrambling section 114 unscrambles the packet of scrambled video data and audio data. Accordingly, the data of the packet of video and audio is separated in the demultiplexing section 115 in the state where the data is already unscrambled.

Identifying whether or not the IC card mounted to the IC card interface section 108 corresponds to a predetermined limited receiving mode (i.e., the limited receiving mode of the broadcasting company A or the limited receiving mode of the broadcasting company B) is performed at the time when the IC card is mounted to the interface section 108.

Figure 2:
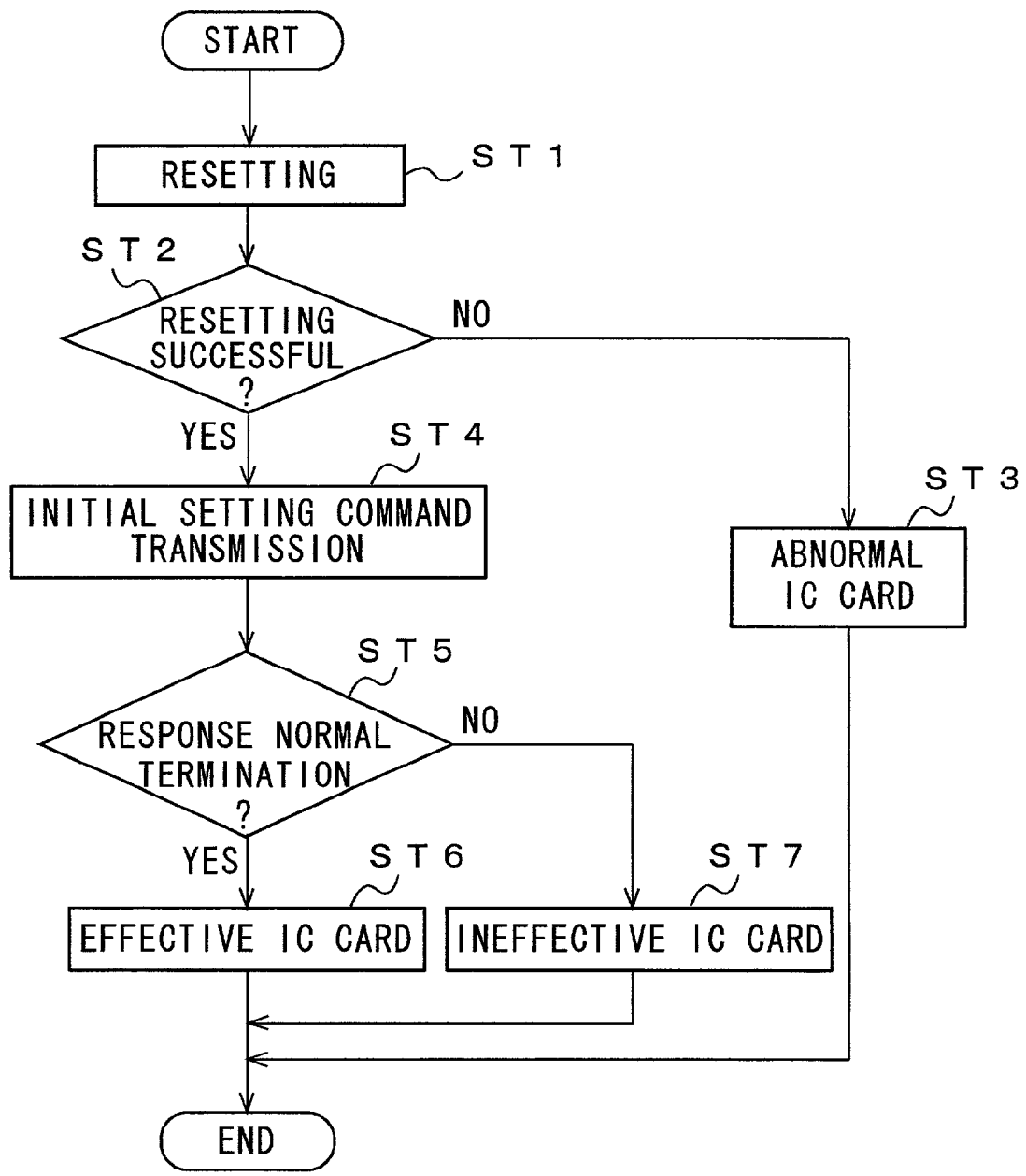
FIG. 2 is a flow chart showing an identifying process by an IC card.

The flow chart of FIG. 2 shows a process for identifying an IC card. This process is initiated when an IC card is mounted to the interface section 108. First, in Step ST1, electric power and a clock are supplied to the IC card to reset the IC card. Then, in Step ST2, it is judged whether or not the resetting has been done successfully. In the resetting step, the transmission rate is set and the exchange of signals at the time of starting communication is confirmed. If the resetting has failed, the process proceeds to Step ST3 where the IC card is regarded as an "abnormal IC card". Then, the process is finished.

On the other hand, when the resetting has been successful, the process proceeds to Step ST4 where an initial setting command determined in a predetermined limited receiving mode is sent to the IC card. Then, in Step ST5, it is judged whether or not the response which the IC card sends to the receiving apparatus in responding to the transmitted initial setting command indicates normal termination of the process. When the response indicates normal termination of the process, the process proceeds to Step ST6 where the IC card is regarded as an IC card effective for the limited receiving mode having the transmitted initial setting command. Then, the process is finished. To the contrary, when the response indicates abnormal termination of the process, the process proceeds to Step ST7 where the IC card is regarded as an IC card ineffective for the limited receiving mode having the transmitted initial setting command. Then, the process is finished.

The data of the packet of video and audio, separated by the demultiplexing section 115, is supplied to the MPEG decoding section 116. The MPEG decoding section 116 performs data elongation for the data of the packet of video, so as to obtain video data. In addition, the MPEG decoding section 116 performs data elongation for the data of the packet of audio, so as to obtain audio data.

The video data, obtained in the MPEG decoding section 116, is supplied to the NTSC encoding section 117. The NTSC encoding section 117 processes the video data, so as to obtain a visual signal SV in NTSC mode. Then, NTSC encoding section 117 outputs the visual signal SV to the output terminal 118. Similarly, the audio data, obtained in the MPEG decoding section 116, is supplied to the sound signal D/A section 119 where the audio data is converted from the digital signal to the analog signal. The resultant analog sound signal SA is output to the output terminal 120.

Figure 3:
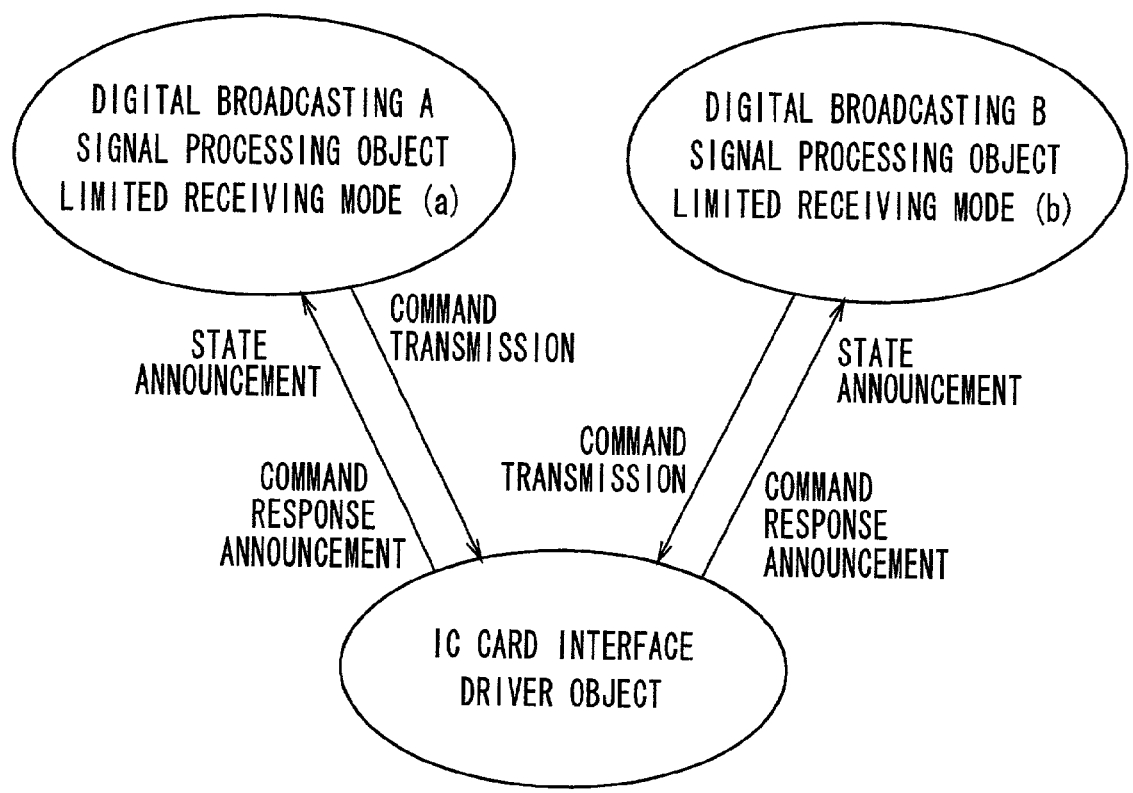
FIG. 3 is a diagram showing an object structure of software in the receiving apparatus.

FIG. 3 is a diagram showing an object structure of software in the digital broadcast receiving apparatus 100 shown in FIG. 1.

A digital broadcast A signal processing object is an object for performing the control necessary for processing and utilizing the signal of the digital broadcast A provided by the broadcasting company A. The digital broadcast A signal processing object has a function of attaining communication protocol between an IC card and the receiving apparatus defined in the limited receiving mode (a) that the digital broadcast A uses.

A digital broadcast B signal processing object is an object for performing the control necessary for processing and utilizing the signal of the digital broadcast B provided by the broadcasting company B. The digital broadcast B signal processing object has a function of attaining communication protocol between an IC card and the receiving apparatus defined in the limited receiving mode (b) that the digital broadcast B uses.

An IC card interface drive object is a driver object of the IC card interface which performs control in accordance with a basic portion (for example, ISO7816-1, 2, 3, and 4) of a communication protocol which is common to the limited receiving mode (a) and the limited receiving mode (b).

In the receiving apparatus 100 having software constituted by an object structure such as shown in FIG. 3, when an IC card is mounted to the IC card interface section 108, the IC card interface drive object detects that the IC card has been mounted to the IC card interface section 108. Based on this detection, the IC card interface drive object supplies necessary electric power to the IC card, and performs necessary resetting. Then, the drive object announces the results of the resetting operation to the digital broadcast A signal processing object and the digital broadcast B signal processing object. The two signal processing objects, upon receiving the result of resetting of the IC card, respectively perform the process of identifying the IC card (Steps ST4 and thereafter in FIG. 2), so as to obtain the results of identification.

Hereinafter, description will be made as to the case where, for example, there is a request for selecting a program relating to the digital broadcast A. In this case, the digital broadcast A signal processing object receives this request, and based on this request, starts the process of selecting the program. If the designated program is of limited reception, the object confirms the result of identification of an IC card. When the IC card is identified as an effective IC card, the object obtains necessary scramble key information by use of the IC card, and attempts to unscramble the data. If the IC card mounted corresponds to the limited receiving mode (a), and also the user has permission to receive the designated program, the user can watch and listen to the program. On the other hand, if the IC card mounted corresponds to the limited receiving mode (b), this means that the digital broadcast A signal processing object judges the IC card mounted as an "ineffective IC card". In this case, it is impossible to unscramble the data.

As has been described above, according to an embodiment of the present invention, it is determined to what limited receiving mode the IC card mounted to the IC card interface section 108 corresponds. If the IC card is an effective IC card which corresponds to the limited receiving mode of the transport stream TS output from the switch 113, limited receiving processing is performed for the transport stream TS by use of the contract information and scramble key information controlled by the IC card.

Specifically, the digital broadcast signal from the broadcasting company A can be received by mounting the IC card corresponding to the limited receiving mode of the broadcasting company A to the interface section 108. Similarly, the digital broadcast signal from the broadcasting company B can be received by mounting the IC card corresponding to the limited receiving mode of the broadcasting company B to the interface section 108. Therefore, this structure allows to provide a receiving apparatus for receiving digital broadcast signals from the broadcasting companies A and B in different limited receiving modes from each other at low cost.

Figure 4:
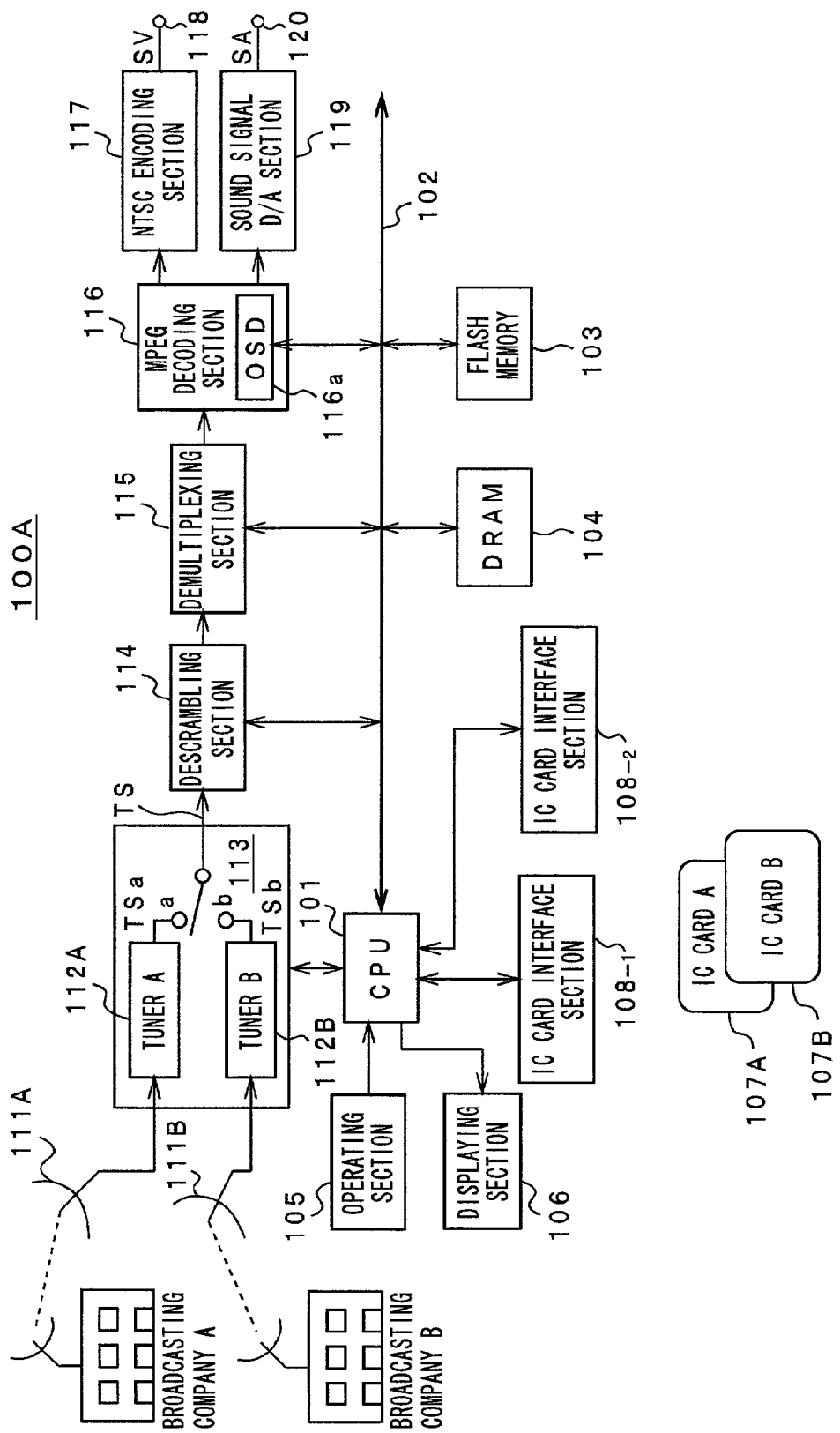
FIG. 4 is a block diagram showing a structure of a digital broadcast receiving apparatus according to another embodiment of the present invention.

Next, another embodiment of the present invention will be described. FIG. 4 is a diagram showing a digital broadcast receiving apparatus 100A according to another embodiment of the present invention. In the receiving apparatus 100A, the same constituent elements as in the receiving apparatus 100 shown in FIG. 1 are denoted by identical reference numerals, and their descriptions will be omitted.

The receiving apparatus 100A includes two IC card interface sections 108-1 and 108-2. Each of the interface sections 108-1, 108-2 is connected to the CPU 101. Other portions of the receiving apparatus 100A have the same structures as in the receiving apparatus 100 shown in FIG. 1.

In the receiving apparatus 100A, when reception of the program designated by the user operation is limited, the CPU 101 confirms the result of identification as to what limited receiving mode the IC cards mounted to the IC card interface sections 108-1 and 108-2 correspond. When an effective IC card which corresponds to the limited receiving mode of the transport stream TS taken out by the switch 113 is mounted to at least one of the interface sections 108-1 and 108-2, the receiving apparatus 100A performs limited receiving processing by use of the IC card.

For example, when an effective IC card is mounted to the interface section 108-1, the CPU 101 transmits limited receiving information, extracted from additional data, to the IC card via the interface section 108-1. The IC card judges whether watching and listening to the program is possible or impossible, based on the limited receiving information. When watching and listening to the program is possible, the IC card sends scramble key information to the CPU 101 via the interface section 108-1. The CPU 101 sets the key information to the descrambling section 114. As a result of this operation, the descrambling section 114 unscrambles the packet of scrambled video data and audio data. Accordingly, the data of the packet of video and audio is separated in the demultiplexing section 115 in the state where the data is already unscrambled.

Figure 5:
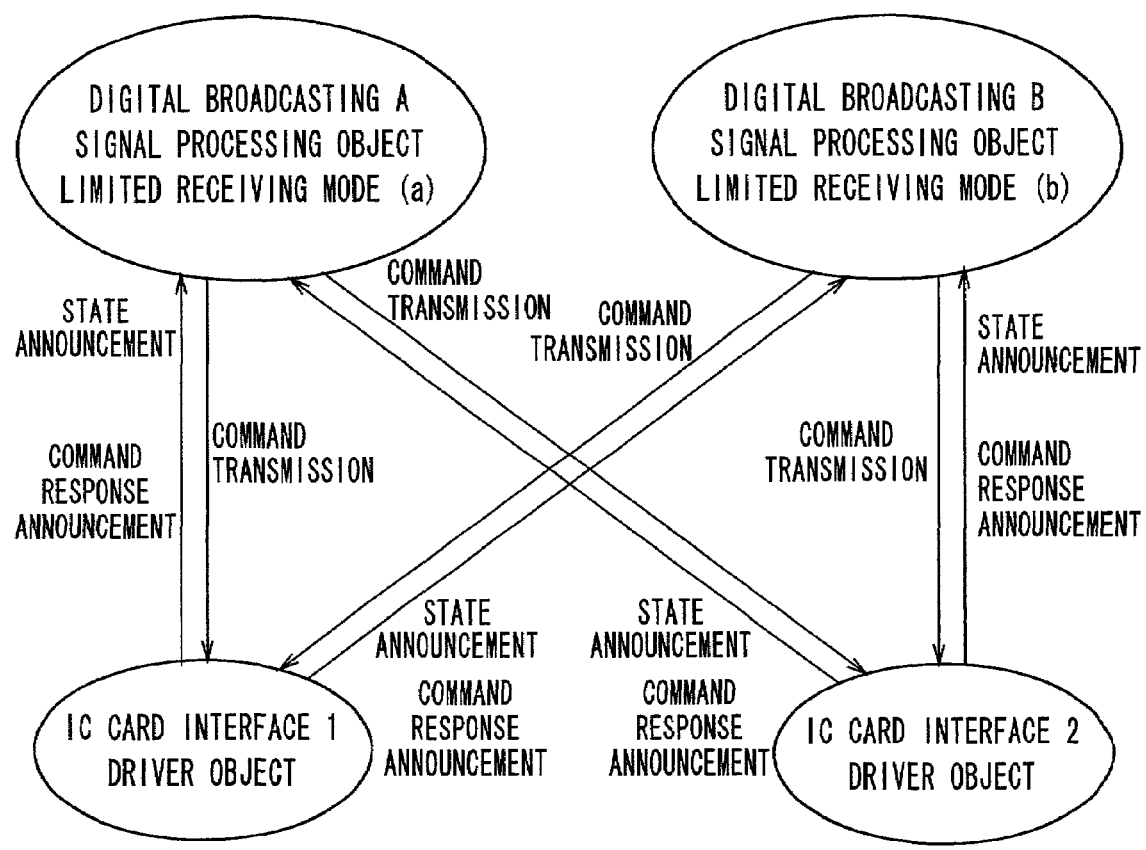
FIG. 5 is a diagram showing an object structure of software in the receiving apparatus (in the case of including two IC card interface sections).

FIG. 5 is a diagram showing an object structure of software in the digital broadcast receiving apparatus 100A shown in FIG. 4.

On top of the digital broadcast A signal processing object and the digital broadcast B signal processing object, there are also an IC card interface 1 driver object and an IC card interface 2 driver object which respectively correspond to the IC card interface sections 108-1 and 108-2. The relationship between one IC card interface driver object and two digital broadcast signal processing objects are the same as in FIG. 3.

In the receiving apparatus 100A having software constituted by an object structure such as shown in FIG. 5, when IC cards are mounted to the IC card interface sections 108-1, 108-2, the IC card interface 1 driver object, and the IC card interface 2 driver object respectively detect that the IC card has been mounted thereto. Based on this detection, the drive object supplies necessary electric power to the IC card, and performs necessary resetting. Then, the drive object announces the results of the resetting operation to the digital broadcast A signal processing object and the digital broadcast B signal processing object. The two signal processing objects, upon receiving the result of resetting of the IC card, respectively perform the process of identifying the IC card mounted to each of the interface sections 108-1 and 108-2 (Steps ST4 and thereafter in FIG. 2), so as to obtain the results of identification.

Description will be made as to the case where, for example, there is a request for selecting a program relating to the digital broadcast A. In this case, the digital broadcast A signal processing object receives this request, and based on this request, starts the process of selecting the program. If the designated program is of limited reception, the object confirms the result of identification of IC cards mounted to the interface sections 108-1 and 108-2. When the IC card corresponding to the limited receiving mode (a), and therefore identified as an effective IC card, is mounted to either one of the interface sections 108-1 and 108-2, the object obtains necessary scramble key information by use of the IC card, and attempts to unscramble the data.

If the IC card mounted to either one of the interface sections 108-1 and 108-2 corresponds to the limited receiving mode (a), and also the user has permission to receive the designated program, the user can watch and listen to the program. On the other hand, if only the IC card corresponding to the limited receiving mode (b) is mounted to one of the interface sections 108-1 and 108-2, this means that the digital broadcast A signal processing object judges the IC card mounted as an "ineffective IC card". In this case, it is impossible to unscramble the data.

As has been described above, according to this other embodiment of the present invention, it is determined to what limited receiving mode the IC cards mounted to the IC card interface sections 108-1 and 108-2 correspond. If the IC card mounted to at least one of the interface sections 108-1 and 108-2 is an effective IC card which corresponds to the limited receiving mode of the transport stream TS output from the switch 113, limited receiving processing is performed for the transport stream TS by use of the contract information and scramble key information controlled by the IC card.

Specifically, the digital broadcast signal from the broadcasting company A can be received by mounting the IC card corresponding to the limited receiving mode of the broadcasting company A to either one of the interface sections 108-1 and 108-2. Similarly, the digital broadcast signal from the broadcasting company B can be received by mounting the IC card corresponding to the limited receiving mode of the broadcasting company B to either one of the interface sections 108-1 and 108-2. Thus, this structure allows to provide a receiving apparatus for receiving digital broadcast signals from the broadcasting companies A and B in different limited receiving modes from each other at low cost. In addition, since it is possible to simultaneously mount IC cards corresponding to the limited receiving modes (a) and (b) to the IC card interface sections 108-1, 108-2, the disadvantage that a user cannot utilize a service which he or she wants to use because the user has not mounted a proper IC card can be prevented before it happens.

By the way, in the receiving apparatus 100A such as shown in FIG. 4, if IC cards corresponding to an identical limited receiving mode are inserted to both of the interface sections 108-1 and 108-2, the following problems arise. That is, the receiving apparatus 100A cannot determine which contract condition between two IC cards should be effective. In addition, when the user watches and listens to a program purchased at deferred payment, the receiving apparatus 100A cannot determine to which IC card the information about the purchase of the program should be stored.

In order to solve such problems, if IC cards corresponding to an identical limited receiving mode are simultaneously inserted into the interface sections 108-1 and 108-2 as described above, this state may be announced to the user by displaying this state on the displaying section 106 or by OSD display. This announcement may be a sound announcement or any other kind of announcement. By gaining a knowledge of this state, the user can select the IC card to be used, thereby preventing the disadvantage, before it happens, that the user loses a chance to use the service he or she wants.

In addition to the above, in order to solve the problem arising in the case where IC cards corresponding to an identical limited receiving mode are simultaneously inserted into the interface sections 108-1 and 108-2 as described above, the receiving apparatus may have the function of selecting either one of the IC cards as an effective IC card, by use of a graphical user interface (GUI), such as a menu.

In the embodiments described above, the present invention has been applied to the receiving apparatuses 100 and 100A, each of which is capable of receiving digital broadcast signals from the broadcasting companies A and B in different limited receiving modes from each other. It will be appreciated, however, that the present invention is also applicable to a receiving apparatus capable of receiving digital broadcast signals in three or more kinds of limited receiving modes.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A digital broadcast receiving apparatus, comprising:
a receiver operable to selectively receive a plurality of digital broadcast signals, and to output digital data corresponding to said received digital broadcast signals, at least some of said output digital data corresponding to a plurality of different limited receiving modes;
a processor operable to selectively perform limited receiving processing for said at least some of said output digital data; a plurality of integrated circuit ("IC") card interface sections each adapted for mounting one of a plurality of IC cards including a first IC card and a second IC card, each of said first and second IC cards controlling contract information and scramble key information necessary for said limited receiving processing;
wherein said processor includes an identifier operable to identify to which of said limited receiving modes said first and second IC cards correspond when said first and second IC cards are mounted to said first and second IC card interface sections;
a controller operable to control said processor to perform said limited receiving processing for said at least some of said output digital data by use of said contract information and said scramble key information controlled by one of said first and second IC cards when said one of said first and second IC cards corresponds to said limited receiving mode of said at least some of said output digital data; and
an announcer operable to make an announcement to a user that said first and second IC cards both correspond to an identical one of said limited receiving modes,
wherein said controller is further operable to permit the user to select said one of said first and second IC cards based on said announcement.

2. The digital broadcast receiving apparatus according to claim 1, wherein said announcer makes said announcement by a display on a displaying section or by an on screen display.

3. The digital broadcast receiving apparatus according to claim 1, wherein said announcer makes said announcement by sound.

4. A digital broadcast receiving apparatus, comprising:
a receiver operable to selectively receive a plurality of digital broadcast signals, and to output digital data corresponding to said received digital broadcast signals, at least some of said output digital data corresponding to a plurality of different limited receiving modes;
a processor operable to selectively perform limited receiving processing for said at least some of said output digital data;
a plurality of integrated circuit ("IC") card interface sections each adapted for mounting one of a plurality of IC cards including a first IC card and a second IC card, each of said first and second IC cards controlling contract information and scramble key information necessary for said limited receiving processing;
wherein said processor includes an identifier operable to identify to which of said limited receiving modes said first and second IC cards correspond when said first and second IC cards are mounted to said first and second IC card interface sections;
a controller operable to control said processor to perform said limited receiving processing for said at least some of said output digital data by use of said contract information and said scramble key information controlled by one of said first and second IC cards when said one of said first and second IC cards corresponds to said limited receiving mode of said at least some of said output digital data and to select said one of said first and second IC cards through use of a graphical user interface when said first and second IC cards both correspond to an identical limited receiving mode, said selected IC card controlling said contract information and said scramble key information during said limited receiving processing.

5. A method for receiving digital broadcasts comprising:
selectively receiving a plurality of digital broadcast signals, and outputting digital data corresponding to said received digital broadcast signals, at least some of said output digital data corresponding to a plurality of different limited receiving modes;
providing a plurality of integrated circuit ("IC") cards corresponding to either an identical one of said limited receiving modes or different ones of said limited receiving modes, each IC card being operable to control contract information and scramble key information necessary to perform limited receiving processing for said at least some of said output digital data;

providing a plurality of IC card interface sections for mounting ones of said IC cards;

mounting a first one of said IC cards to a first one of said IC card interface sections and mounting a second one of said IC cards to a second one of said IC card interface sections;

identifying to which of said limited receiving modes said first and second IC cards correspond;

performing said limited receiving processing for said at least some of said output digital data by use of said contract information and said scramble key information controlled by one of said first and second IC cards when said one of said first and second IC cards corresponds to said limited receiving mode of said at least some of said output digital data; and making an announcement to a user when said first and second IC cards both correspond to said identical one of said limited receiving modes; and permitting the user to select said one of said first and second IC cards based on said announcement.

6. The method for receiving digital broadcasts according to claim 5, wherein said announcement is made on a displaying section or on an on screen display.

7. The method for receiving digital broadcasts according to claim 5, wherein said announcement is made by sound.

8. A method for receiving digital broadcasts comprising:

selectively receiving a plurality of digital broadcast signals, and outputting digital data corresponding to said received digital broadcast signals, at least some of said output digital data corresponding to a plurality of different limited receiving modes;

providing a plurality of integrated circuit ("IC") cards corresponding to either an identical one of said limited receiving modes or different ones of said limited receiving modes, each IC card being operable to control contract information and scramble key information necessary to perform limited receiving processing for said at least some of said output digital data;

providing a plurality of IC card interface sections for mounting ones of said IC cards;

mounting a first one of said IC cards to a first one of said IC card interface sections and mounting a second one of said IC cards to a second one of said IC card interface sections;

identifying to which of said limited receiving modes said first and second IC cards correspond;

performing said limited receiving processing for said at least some of said output digital data by use of said contract information and said scramble key information controlled by one of said first and second IC cards when said one of said first and second IC cards corresponds to said limited receiving mode of said at least some of said output digital data; and said first and second IC cards both correspond to said identical one of said limited receiving modes, selecting one of said first and second IC cards through use of a graphical user interface, said selected IC card serving as an effective IC card for control of said contract information and said scramble key information during said step of performing said limited receiving processing.

* * * * *

UNITED STATES PATENT AND TRADEMARK OFFICE
CERTIFICATE OF CORRECTION

PATENT NO. : 6,968,018 B2
DATED : November 22, 2005
INVENTOR(S) : Toshisada Ishii It is certified that error appears in the above-identified patent and that said Letters Patent is hereby corrected as shown below:

Column 14,
Line 24, before "said" insert -- when --.

Signed and Sealed this

Fourteenth Day of February, 2006

JON W. DUDAS
*Director of the United States Patent and Trademark Office*